(12) United States Patent
Cheng et al.

(10) Patent No.: US 9,675,049 B2
(45) Date of Patent: Jun. 13, 2017

(54) PET AMUSEMENT DEVICE

(71) Applicant: PAWBO INC., Taipei (TW)

(72) Inventors: Che Yuan Cheng, Taichung (TW); Hung Chin Hsiao, New Taipei (TW)

(73) Assignee: PAWBO INC., Taipei (TW)

( * ) Notice: Subject to any disclaimer, the term of this patent is extended or adjusted under 35 U.S.C. 154(b) by 140 days.

(21) Appl. No.: 14/683,202

(22) Filed: Apr. 10, 2015

(65) Prior Publication Data

US 2016/0295836 A1 Oct. 13, 2016

(51) Int. Cl.
*A01K 5/02* (2006.01)
*A01K 15/02* (2006.01)

(52) U.S. Cl.
CPC .............. *A01K 15/025* (2013.01); *A01K 5/02* (2013.01)

(58) Field of Classification Search
CPC ......... A01K 5/02; A01K 5/0291; A01K 15/02
See application file for complete search history.

(56) References Cited

U.S. PATENT DOCUMENTS

| | | | | |
|---|---|---|---|---|
| 2,969,769 A * | 1/1961 | Paschall | ............... | A01K 5/0275 119/53 |
| 4,248,175 A * | 2/1981 | Navarro | ............... | A01K 5/0291 119/51.12 |
| 4,249,483 A * | 2/1981 | Sobky | ................. | A01K 5/0291 119/51.12 |
| 4,421,059 A * | 12/1983 | Cousino | ............... | A01K 5/0291 119/51.12 |
| 4,450,790 A * | 5/1984 | Stansbury, Jr. | ....... | A01K 5/0291 119/51.12 |
| 4,485,765 A * | 12/1984 | Schwartz | ............. | A01K 5/0291 119/51.13 |
| 4,492,183 A * | 1/1985 | Chiotasso | ............ | A01K 5/0291 119/51.13 |
| 4,501,229 A * | 2/1985 | Williamson | ......... | A01K 5/0291 119/51.12 |
| 4,617,874 A * | 10/1986 | Zammarano | ......... | A01K 5/0291 119/51.12 |
| 4,671,210 A * | 6/1987 | Robinson | ............. | A01K 5/0291 119/51.12 |
| 4,981,106 A * | 1/1991 | Nagatomo | ........... | A01K 5/0275 119/51.11 |
| 5,078,097 A * | 1/1992 | Chisholm | ............ | A01K 5/0291 119/51.11 |
| 5,377,620 A * | 1/1995 | Phillippi | .............. | A01K 5/0291 119/51.12 |
| 5,975,024 A * | 11/1999 | Sheaffer | ................. | A01K 1/031 119/464 |

(Continued)

*Primary Examiner* — Monica Williams
(74) *Attorney, Agent, or Firm* — Jianq Chyun IP Office

(57) ABSTRACT

A pet amusement device includes a housing; a processing unit disposed in the housing; a transceiver for transmitting signals to the processing unit; an image fetching unit disposed in the housing and configured to encode digital images and videos of a pet, storing the recoded images and videos in digital files, and sending them to the processing unit; an amusing unit for amusing the pet; a feeding unit disposed on the housing and configured to feed the pet; and a power source for supplying power to the processing unit, the transceiver, the image fetching unit, the amusing unit, and the feeding unit respectively. The processing unit controls the transceiver, the image fetching unit, the amusing unit, and the feeding unit respectively.

8 Claims, 5 Drawing Sheets

(56) References Cited

U.S. PATENT DOCUMENTS

| | | | | |
|---|---|---|---|---|
| 6,349,671 | B1* | 2/2002 | Lewis | A01K 5/0291 |
| | | | | 119/51.02 |
| 6,427,628 | B1* | 8/2002 | Reece | A01K 5/0291 |
| | | | | 119/51.11 |
| 6,766,766 | B1* | 7/2004 | Elliott | A01K 5/0291 |
| | | | | 119/51.12 |
| 8,707,900 | B1* | 4/2014 | Womble | A01K 5/0114 |
| | | | | 119/51.11 |
| 2005/0066905 | A1* | 3/2005 | Morosin | A01K 5/0291 |
| | | | | 119/51.02 |
| 2005/0252457 | A1* | 11/2005 | Morosin | A01K 5/0291 |
| | | | | 119/51.13 |
| 2006/0219187 | A1* | 10/2006 | Krishnamurthy | A01K 5/0275 |
| | | | | 119/719 |
| 2008/0289580 | A1* | 11/2008 | Krishnamurthy | A01K 5/0291 |
| | | | | 119/51.11 |
| 2014/0090601 | A1* | 4/2014 | Stone | A01K 5/0114 |
| | | | | 119/51.01 |
| 2014/0277701 | A1* | 9/2014 | Martin | A01K 5/0114 |
| | | | | 700/231 |
| 2016/0007565 | A1* | 1/2016 | Trottier | A01K 5/02 |
| | | | | 119/51.02 |

* cited by examiner

PET AMUSEMENT DEVICE

BACKGROUND OF THE INVENTION

1. Field of the Invention

The invention relates to amusement devices and more particularly to a device for entertaining and amusing pets.

2. Description of Related Art

There is a conventional pet amusement device including a weighted base with a curved outer surface, and a fan within the base for directing airflow into a transparent viewing chamber which contains flying particles. The particles may be luminescent to glow in the dark. The device can appeal to the animal's stalking instincts and return to an upright position when pawed or struck.

While the device has been fully successful for its intended purpose, further improvements regarding pet amusement are still sought.

SUMMARY OF THE INVENTION

It is therefore one object of the invention to provide a pet amusement device comprising a housing; a processing unit disposed in the housing; a transceiver for transmitting signals to the processing unit; an image fetching unit disposed in the housing and configured to encode digital images and videos of a pet, storing the recoded images and videos in digital files, and sending them to the processing unit; an amusing unit for amusing the pet; a feeding unit disposed on the housing and configured to feed the pet; and a power source for supplying power to the processing unit, the transceiver, the image fetching unit, the amusing unit, and the feeding unit respectively; wherein the processing unit is configured to control the transceiver, the image fetching unit, the amusing unit, and the feeding unit respectively.

The above and other objects, features and advantages of the invention will become apparent from the following detailed description taken with the accompanying drawings.

DETAILED DESCRIPTION OF THE INVENTION

Figure 1:
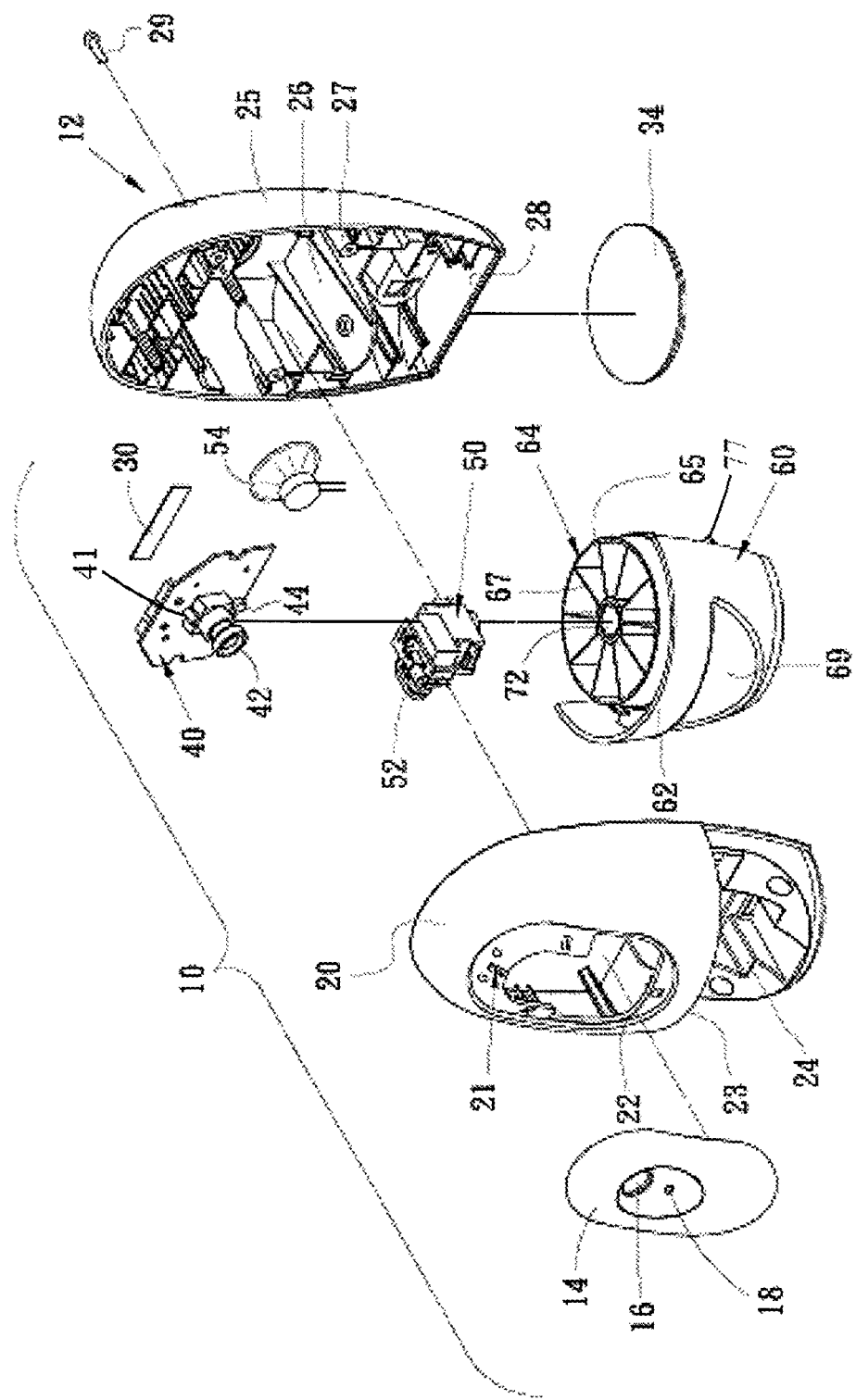
FIG. 1 is an exploded view of a pet amusement device according to a first preferred embodiment of the invention.
Figure 2:
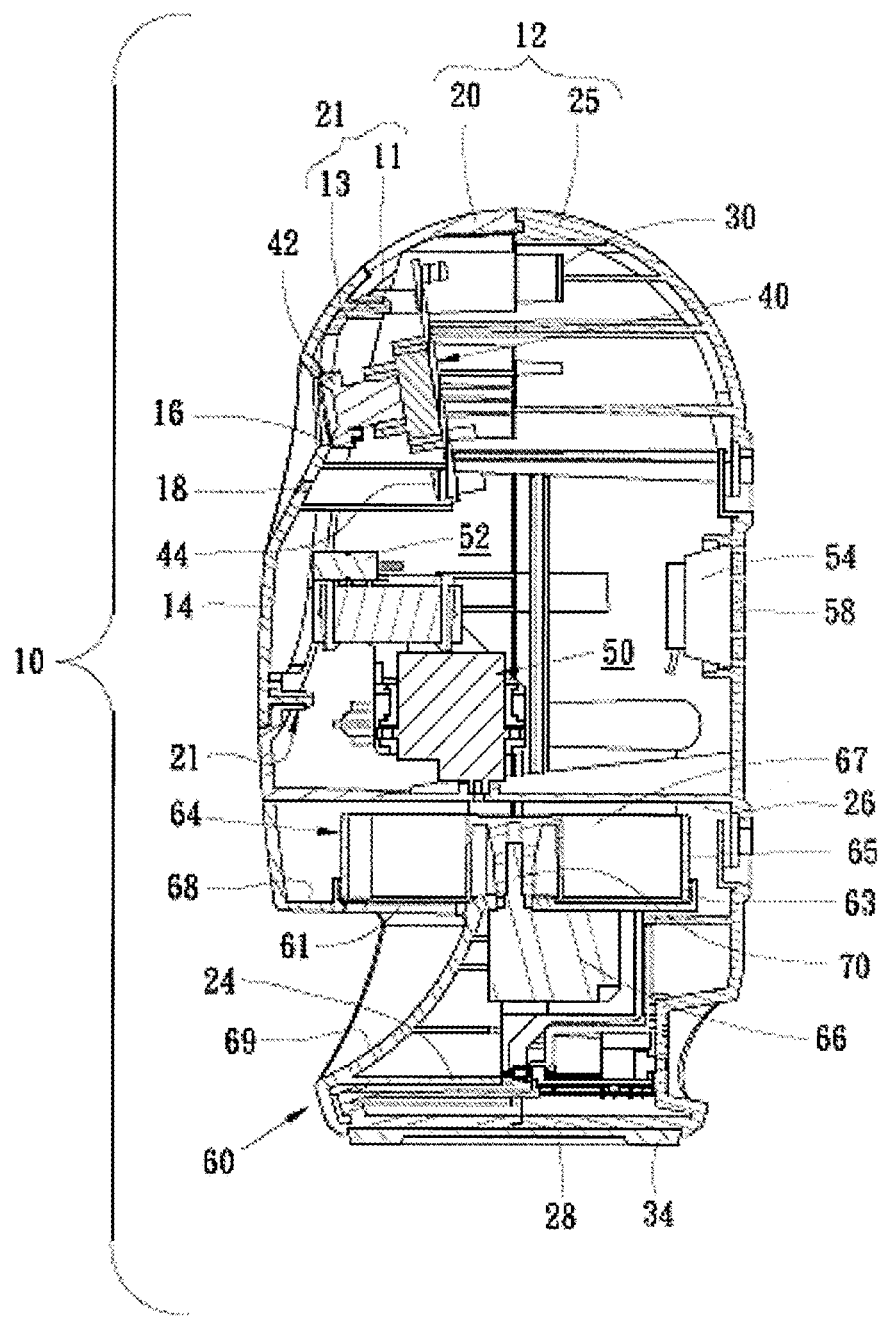
FIG. 2 is a longitudinal sectional view of the assembled pet amusement device.
Figure 3:
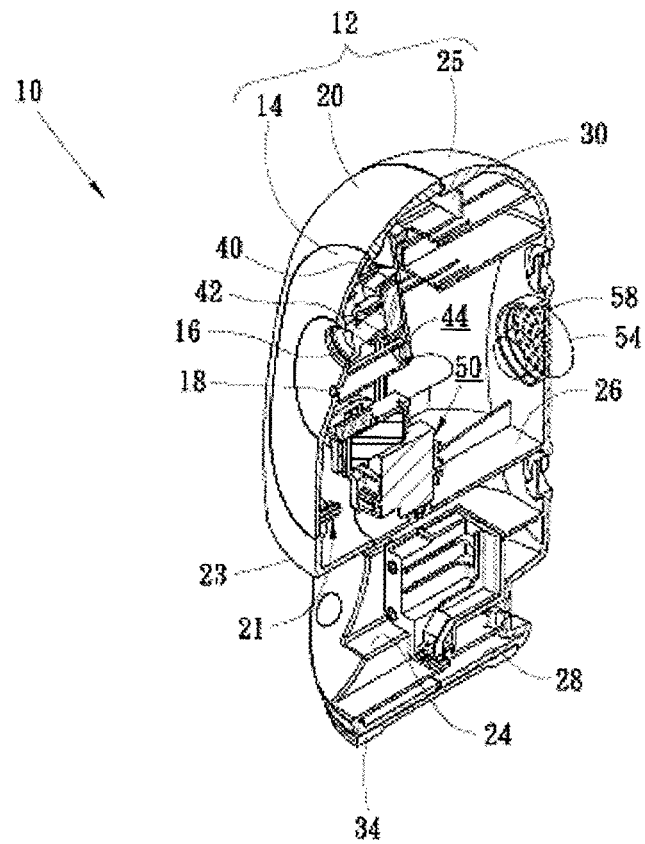
FIG. 3 is a broken away view of the housing of the pet amusement device.
Figure 4:
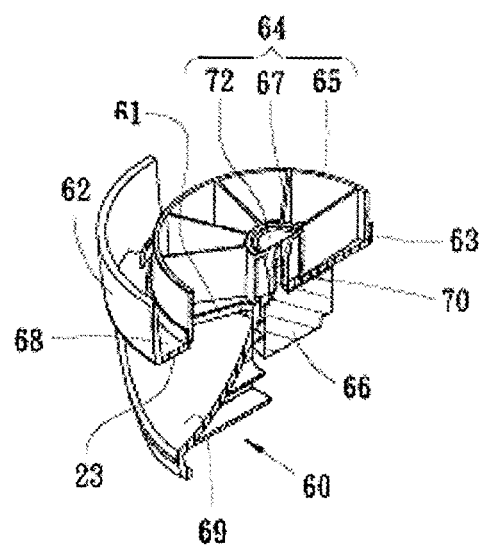
FIG. 4 is a broken away view of the feeding unit of the pet amusement device.
Figure 5:
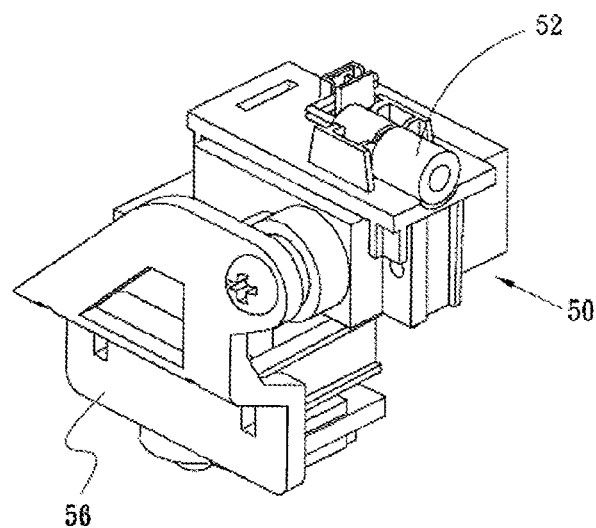
FIG. 5 is a perspective view of the amusing unit of the pet amusement device.

Referring to FIGS. 1 to 5, a pet amusement device 10 in accordance with a first preferred embodiment of the invention comprises the following components as discussed in detail below.

A housing 12 is rotatably secured to a disc-shaped base 34. The housing 12 includes an oval first shell 20 including a peripheral opening 22, a second shell 25 releasably secured to the first shell 20, and a transparent cap 14 releasably secured to the opening 22 of the first shell 20. An image recording aperture 16 and a sound recording aperture 18 are provided through the cap 14. A recess 23 is provided on a lower portion of the first shell 20. A rail 24 having a longitudinal section of "T" is formed in an intermediate portion of the recess 23. A plurality of fastening structures 21 are provided and each fastening structure 21 includes a latch 11 projecting out of an edge of a rear portion of the cap 14, and a hole 13 in an edge of the opening 22. The latch 11 is inserted into the hole 13 to fasten the cap 14 and the first shell 20 together.

The second shell 25 includes a horizontal intermediate plate 26 and a horizontal bottom plate 28 so that two compartments can be formed. A plurality of bosses 27 having threaded holes are formed in the second shell 25. A plurality of screws 29 are driven through the bosses 27 into the first shell 20 to fasten the first and second shells 20, 25 together to form the housing 12. A processing unit 40, a transceiver 30, an image fetching unit 41, an amusing unit 50, and a feeding unit 60 are mounted in the housing 12. The processing unit 40 is implemented as a central processing unit (CPU) and is electrically connected to the transceiver 30, the image fetching unit 41, the amusing unit 50, and the feeding unit 60 respectively for controlling their operations. Mobile apps are installed in the processing unit 40. It is noted that the term "app" is a shortening of the term "application software".

The mobile apps can determine meaning of a pet bark and sound made by a pet. The transceiver 30 is implemented as a base station. The image fetching unit 41 includes a lens 42 and a microphone 44 and is fastened in the housing 12. The lens 42 is in the opening 22 facing the image recording aperture 16. The microphone 44 can convert sound through the sound recording aperture 18 into an electrical signal as known in the art. The amusing unit 50 includes a loudspeaker 54 facing an opening 58 on the first shell 25, and a laser device 52 provided on a mount 56 which is fastened on the plate 26.

The feeding unit 60 includes a frame 62, a food container 64, and a motor (e.g., stepper motor) 66. The feeding unit 60 is secured to the recess 23. An intermediate platform 68 is provided in the feeding unit 60 and the motor 66 is secured to the platform 68. A motor shaft 70 extends through the platform 68. A closed flange 63 is formed on the platform 68. The hollow, cylindrical food container 64 has a lower portion rotatably engaged the flange 63. A channel 61 is formed on the platform 68 and is in the flange 63. An outlet 69 is formed on a lower portion of the frame 62. The outlet 69 communicates with the channel 61. A hollow hub 72 is formed in the food container 64. A plurality of equally spaced walls 67 are provided between an outer surface 65 of the food container 64 and the hub 72 to divide a space between the outer surface 65 of the food container 64 and the hub 72 into a plurality of compartments (i.e., circular sectors). The motor shaft 70 is disposed in the hub 72. After activating the motor 66, a stepwise rotation of the motor shaft 70 rotates the food container 64 about the platform 68. Food in one of the circular sectors of the food container 64 drops through the channel 61 into the outlet 69 if the circular sector is directly above the channel 61. Food in other circular sectors of the food container 64 is blocked by the platform 68. The feeding unit 60 can be mounted at the recess 23 by inwardly sliding on the rail 24 or disengaged from the recess 23 by sliding on the rail 24 in an opposite direction. This operation is similar to drawer and facilitates food replenishment.

A DC input terminal 77 as power source is provided in the feeding unit 60 for supplying power to the processing unit 40, the transceiver 30, the image fetching unit 41, the amusing unit 50, and the feeding unit 60 respectively.

Figure 6:
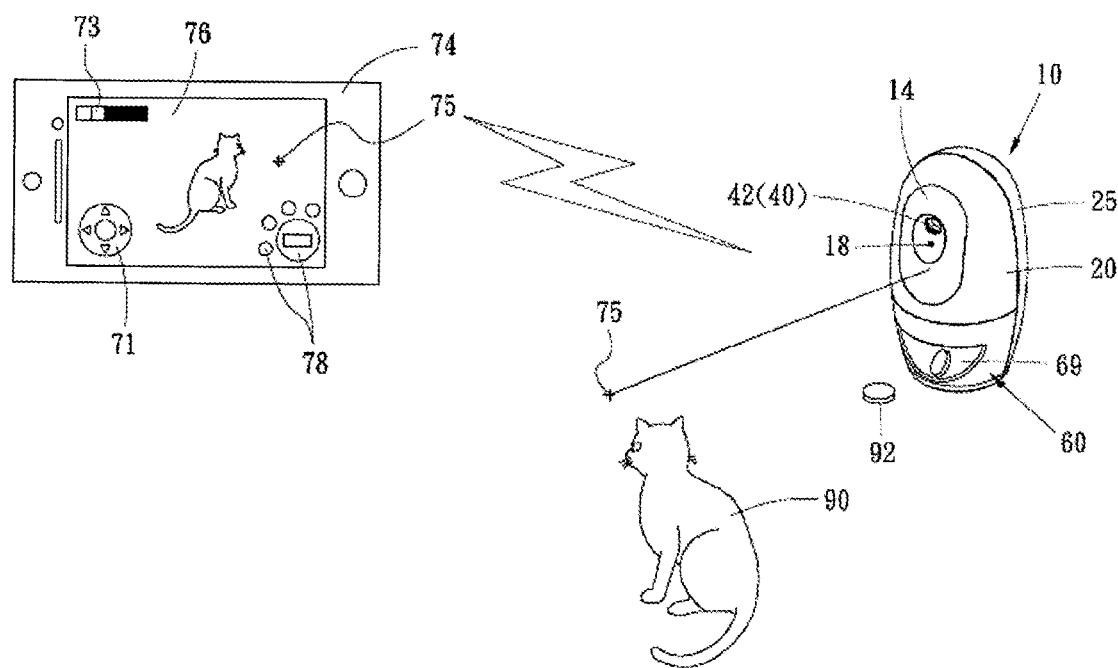
FIG. 6 schematically depicts a pet amusement system incorporating the pet amusement device of the invention and a mobile device for controlling the pet amusement device.

Referring to FIG. 6, a pet amusement system incorporating the pet amusement device 10 and a mobile device 74 is shown. In a food feeding operation, the pet amusement device 10, as controlled by the processing unit 40 or instructed by a received control signal transmitted from the mobile device 74, is activated. And in turn, the motor 66 is activated to turn the food container 64 a predetermined angle (e.g., a central angle of the circular sector). As such, food in one of the circular sectors of the food container 64 drops through the channel 61 into the outlet 69 if the circular sector is directly above the channel 61. Finally, the food leaves the outlet 69 to be eaten by the pet 90.

The mobile device 74 is implemented as a smart phone or iPad and includes a display (e.g., touchscreen) 76 for allowing a pet owner to interact directly with what is displayed. A plurality of function keys 78, a direction button 71, and a pet temper indicator 73 are provided on the display 76. The direction button 71 contains up, down, left and right direction arrows for selection. A pet owner may press one of the function keys 78 to activate the pet amusement device 10 which then performs a corresponding function. Also, the pet amusement device 10 may be activated after the pet temper indicator 73 indicating a low value. The activated pet amusement device 30 then transmits a signal to the pet owner owning the mobile device 74. The signal is converted into a representation. Thus, the pet owner may be visually alerted by the representation to take care of the pet 90. Signals transmitted from the mobile device 74 are received by the transceiver 30 via the Internet. The signals are then sent to the processing unit 40 for processing. The image fetching unit 41 can be activated by the processing unit 40 32 as a result of the processing. Images of the pet 90 are fetched by the image fetching unit 41 if the pet 90 is located within an image fetching range of the image fetching unit 41. Further, the images are processed by the processing unit 40. Furthermore, the processed images of the pet 90 are sent back to the mobile device 74 and shown on the display 76.

The processing unit 40 is capable of generating an identification result indicating whether there is a bark from a target pet. The transceiver 30 can receive a control signal from the mobile device 74 and/or send signals to the mobile device 74. The image fetching unit 41 is implemented as a digital camera capable of encoding digital images and videos of a pet, storing the recoded images and videos in digital files, and sending them to the processing unit 40 to further process.

The pet owner may get the pet 90 within image fetching range of the image fetching unit 41 if the pet 90 is not in the range by performing the following two methods: The pet owner may call the mobile device 74 which broadcasts the call to the pet 90. Alternatively, the owner may run a pre-recorded audio file to broadcast a call to the pet 90.

The pet 90 may make sound. The processing unit 40 may compare the sound with a predetermined value. A comparison result is reflected by the pet temper indicator 73. The owner can determine temper of the pet 90 by viewing brightness of the boxes of the pet temper indicator 73. The owner may press one of the function keys 78 to activate the feeding unit 60 if the owner determines that the sound made by the pet 90 means hungry. As a result, food is supplied from the outlet 69 of the feeding unit 60 to the pet 90 for consumption.

The owner can determine that the pet 90 feels lonely by its sound. Then the owner can activate the amusing unit 50 which emits light to impinge on the ground as indicated by a flashing point 75 on the display 76. The pet 90 may chase the flashing point 75. Further, images of the pet 90 chasing the flashing point 75 are shown on the display 76. This is similar to the owner playing with the pet 90 in person.

Figure 7:
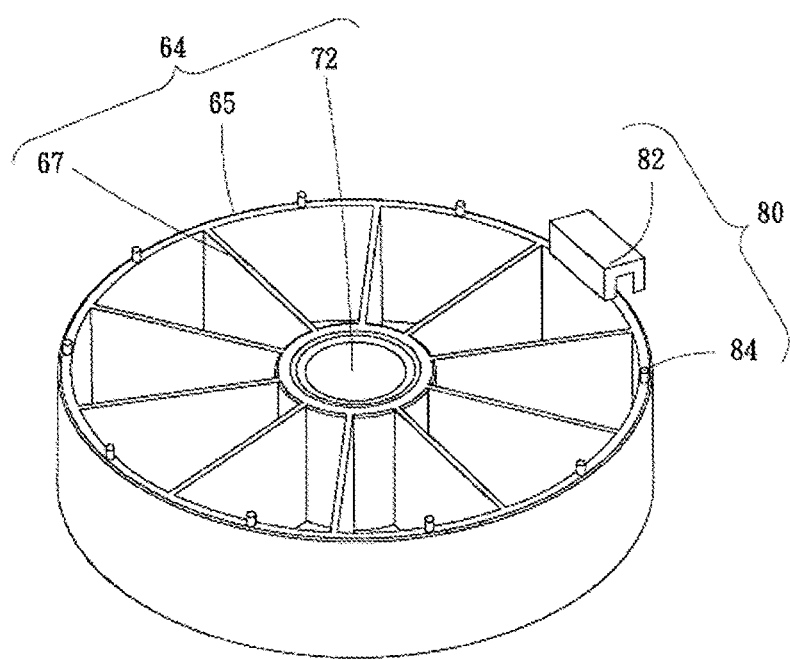
FIG. 7 is a perspective view of a pet amusing unit and a step controller of a pet amusement device according to a second preferred embodiment of the invention.

Referring to FIG. 7, a pet amusement device in accordance with a second preferred embodiment of the invention is shown. The characteristics of the second preferred embodiment are substantially the same as that of the first preferred embodiment except the following: A step controller 80 is provided. The step controller 80 includes a sensor 82 slightly above the outer surface 65 of the food container 64, and a plurality of projections 84 on the outer surface 65 of the food container 64. A stepwise rotation of the food container 64 can be sensed by sensing the moving projection 84 by the sensor 82. Therefore, the food feeding can more precisely controlled.

While the invention has been described in terms of preferred embodiments, those skilled in the art will recognize that the invention can be practiced with modifications within the spirit and scope of the appended claims.

What is claimed is:

1. A pet amusement device comprising:
    a housing;
    a processing unit disposed in the housing;
    a transceiver for transmitting signals to the processing unit;
    an image fetching unit disposed in the housing and configured to encode digital images and videos of a pet, storing the recoded images and videos in digital files, and sending them to the processing unit;
    an amusing unit for amusing the pet;
    a feeding unit disposed on the housing and configured to feed the pet, comprising:
        a hollow, cylindrical food container, disposed in and rotatably engaging an annular flange, including a hub and a plurality of equally spaced walls formed between an outer surface of the food container and the hub, wherein an outlet communicates with the food container through a channel; and
        a motor, including a motor shaft disposed in and rotatably secured to the hub, configured to rotate the food container about the annular flange via the motor shaft and the hub; and
    a DC input terminal as power source is for supplying power to the processing unit, the transceiver, the image fetching unit, the amusing unit, and the feeding unit respectively;
    wherein the processing unit is configured to control the transceiver, the image fetching unit, the amusing unit, and the feeding unit respectively.

2. The pet amusement device of claim 1, wherein the housing comprises:
    a first shell including a peripheral opening, a recess disposed under the peripheral opening, and a rail disposed in the recess;
    a transparent or translucent cap releasably secured to the peripheral opening, an image recording aperture through the cap, a sound recording aperture through the cap; and
    a second shell releasably secured to the first shell.

3. The pet amusement device of claim 2, wherein the image fetching unit includes a lens and a microphone, wherein the lens is in the peripheral opening facing the image recording aperture, and wherein the microphone is configured to convert sound through the sound recording aperture into an electrical signal.

4. The pet amusement device of claim 2, wherein the amusing unit includes a laser device facing the cap and disposed on a mount which is fastened in the housing.

5. The pet amusement device of claim 4, wherein the amusing unit further comprises a loudspeaker on the housing.

6. The pet amusement device of claim 2, wherein the feeding unit is releasably mounted on the rail and further comprises:
    a frame including the outlet, a platform having the channel on a bottom, and the annular flange formed on the platform;
    wherein the motor is secured to the platform and the motor shaft extends through the platform.

7. The pet amusement device of claim 6, further comprising a step controller for stepwise moving the food container.

8. The pet amusement device of claim 7, wherein the step controller includes a sensor disposed above the outer surface of the food container, and a plurality of projections disposed on the outer surface of the food container; and wherein the sensor is configured to sense a stepwise rotation of the food container by sensing one of the projections.

\* \* \* \* \*